April 16, 1968     W. R. CHASE ET AL     3,378,204
NOZZLE
Filed Jan. 14, 1966
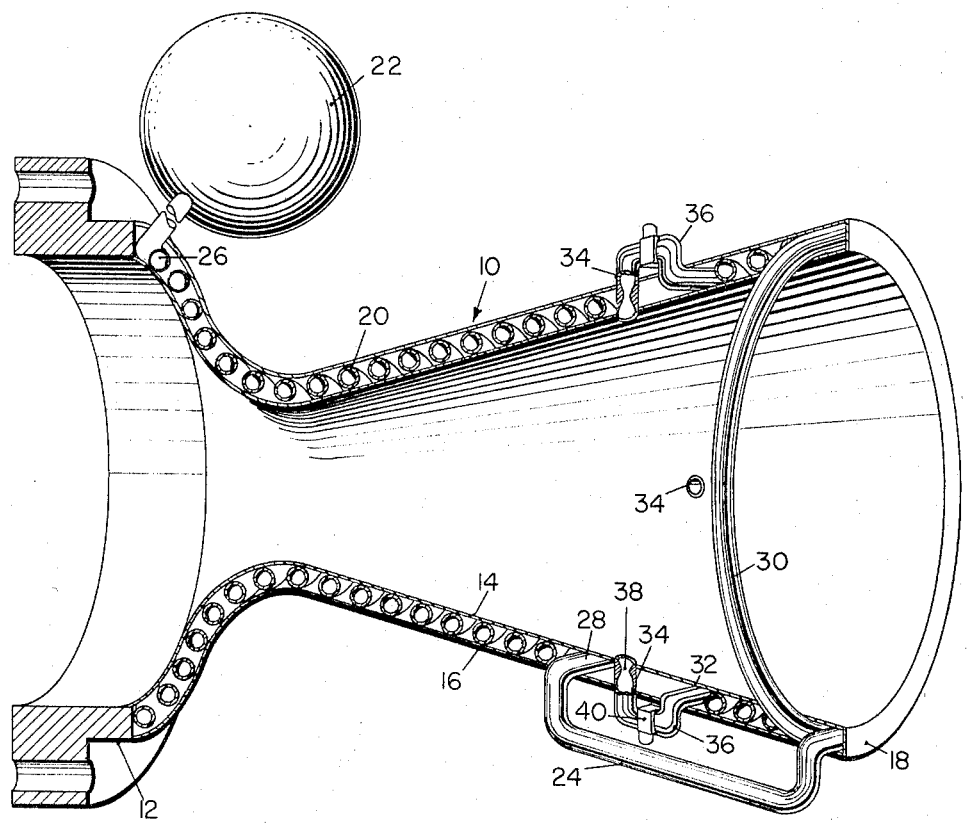
INVENTOR.
VALIE P. HOVNANIAN
WAYNE R. CHASE
BY *Edwin D. Grant*
ATTORNEY United States Patent Office 3,378,204
Patented Apr. 16, 1968

3,378,204
NOZZLE
Wayne R. Chase, Rochester, Mich., and Valie P. Hovnanian, Palos Verdes, Calif., assignors to Thiokol Chemical Corporation, Bristol, Pa., a corporation of Delaware
Filed Jan. 14, 1966, Ser. No. 520,618
1 Claim. (Cl. 239—127.3)

ABSTRACT OF THE DISCLOSURE

An apparatus for cooling a rocket motor thrust nozzle and for varying the line of thrust thereof by injecting a fluid into the exhaust stream. The apparatus includes helically wound conduit in the walls of the thrust nozzle to conduct the fluid, in heat transferring relation with said thrust nozzle, into the exhaust gases for varying the thrust line of said motor.

This invention relates to apparatus for cooling a rocket thrust nozzle and varying the line of thrust thereof. More particularly, this invention relates to apparatus for varying the line of thrust of a rocket thrust nozzle by injection of a fluid transversely into the exhaust stream flowing therethrough, and for cooling the wall of said rocket thrust nozzle by means of said fluid.

In the design of a rocket which has a long burning period and which generates a high temperature exhaust gas, it is necessary to provide some means for cooling the thrust nozzle of the rocket. It has also been found advantageous to vary the line of thrust of a rocket by the so-called system of secondary injection, which consists of the injection of a fluid transversely into the exhaust stream of the rocket so as to create laterally acting forces against the thrust nozzle of the rocket. This invention provides a combination nozzle cooling and secondary injection system by means of which the fluid injected into a rocket thrust nozzle to control its thrust vector is utilized to cool critical areas of the thrust nozzle, thereby eliminating the bulk, weight and complexity of conventional nozzle cooling and secondary injection systems having separate components.

Accordingly, it is an object of this invention to provide more efficient means for cooling a rocket thrust nozzle and varying the thrust vector thereof.

Another object of this invention is to provide a lightweight system for both cooling a rocket thrust nozzle and varying the thrust vector thereof.

These objects are accomplished by a preferred embodiment of the invention that is described in detail hereinafter and illustrated in the accompanying drawing, which is a longitudinal sectional view of a rocket thrust nozzle with which the embodiment is employed. In the drawing portions of components of the preferred embodiment of the invention are cut away for clarity.

Throughout the following description and in the drawing of the preferred embodiment of the invention, like reference numbers refer to like parts.

In the drawing reference number 10 generally designates a rocket thrust nozzle having an adapter flange 12 fixedly joined to the forward ends of an inner wall 14 and outer wall 16 of said thrust nozzle. Outer wall 16 is concentric with inner wall 14 and spaced therefrom, and the aft ends of said walls are joined by an annular end closure 18. Helically wound around inner wall 14 and in contact therewith is a continuous conduit 20, the forward end of which is communicatively connected to a supply tank 22. Although for the sake of simplicity supply tank 22 is illustrated as being located adjacent thrust nozzle 10, it is preferably disposed within the rocket casing (not shown) on which the thrust nozzle is mounted. Supply tank 22 is provided with conventional means, such as a pump, expandable inner bag, or the like, adapted to force fluid coolant held in the supply tank through conduit 20. As illustrated in the drawing, conduit 20 is disposed between the walls 14, 16 and forms a coil having forward and aft sections which are spaced apart longitudinally of thrust nozzle 10 and joined by a portion 24 of said conduit which extends longitudinally of said thrust nozzle. It will also be noted in the drawing that the winding of the turns of conduit 20 in the forward section of the coil formed thereby is different from the winding of the turns of said conduit in the aft section of said coil. If the first turn of conduit 20 in each of the two sections of the coil is defined as that turn of the conduit which is nearest to supply tank 22, as measured by distance along the conduit itself, it will be seen that the first turn 26 of the conduit in the forward section of said coil is disposed adjacent the forward end of thrust nozzle 10 and the last turn 28 of the conduit in the same section is disposed aft of the throat of said thrust nozzle. However, the first turn 30 of conduit 20 in the aft section of the coil is disposed adjacent the aft end of thrust nozzle 10, and the last turn 32 of said conduit in the same section is disposed forward of said last turn 30.

The described embodiment of the invention is also provided with four injection nozzles 34 (only three of which are illustrated in the drawing) each of which is communicatively connected to conduit 20 (or more particularly, to the last turn 32 of said conduit in the aft section of the coil formed thereby) by means of a U-shaped branch conduit 36. Injection nozzles 34 are spaced circumferentially of thrust nozzle 10 at 90° intervals, are equidistant from the aft end thereof, and are respectively fixedly engaged within apertures formed in the inner and outer walls 14, 16 of thrust nozzle 10. Each injection nozzle 34 includes a venturi-type orifice 38 the longitudinal axis of which is disposed substantially perpendicular to the longitudinal axis of thrust nozzle 10, so that the coolant forced through the injection nozzle is injected transversely into the interior of said thrust nozzle. A valve 40 is disposed in the branch conduit 36 between each injection nozzle 34 and the turn 32 of conduit 20 to which the injection nozzles are connected, this valve being adapted to reduce or completely block the flow of coolant through the injection nozzle when the valve is actuated by remote control means (not shown) connected thereto.

During operation of the rocket of which thrust nozzle 10 is a component, coolant is forced from supply tank 22 into conduit 20. The flow of coolant through conduit 20 is rearward through the forward section of the coil formed by the conduit, thence rearward through portion 24 thereof to the first turn 30 of the conduit in the aft section of said coil, and finally forward through the other turns of the conduit in said aft section to injection nozzles 34. In order to provide for continuous cooling of thrust nozzle 10, coolant flows through conduit 10 continuously during the firing of the rocket, the laterally-acting forces which are thereby exerted against the inner wall 14 of said thrust nozzle balancing one another so that the line of thrust of said thrust nozzle is coincident with its longitudinal axis. It will be appreciated that in order to obtain substantially equal flow of coolant from injection nozzles 36, the pressure drop between the latter must be taken into account. However, substantially equal flow of coolant from thrust nozzles 36 may readily be obtained by, for example, varying the diameter of the orifices 38 thereof. When the thrust vector of thrust nozzle 10 is to be changed, one or more of the valves 40 is actuated to either reduce or completely block the flow of coolant to the injection nozzle or nozzles 36 associated therewith. This selective change in flow of coolant from injection nozzles 36 produces an imbalance between the laterally-acting forces exerted against the inner wall 14 of thrust nozzle 10, which of course changes the thrust vector of said thrust nozzle and of the rocket of which it is a component. It is a particularly advantageous feature of this invention that the fluid used for secondary injection into the exhaust stream flowing though thrust nozzle 10 is also utilized to cool the latter. The heat transferred to the coolant as it flows to injection nozzles 34 will also increase the effectiveness of injection of said coolants into the rocket exhaust, particularly if the coolant is a combustible liquid. Furthermore, the arrangement of conduit 20 provides cooling of substantially all of the surface of thrust nozzle 10. It should therefore be recognized that the preferred embodiment of the invention disclosed hereinabove provides an efficient, light-weight system for both cooling a rocket thrust nozzle and varying the line of thrust thereof.

It will also be recognized that various changes may be made in the construction and arrangement of the described nozzle cooling and thrust vector control system without departing in any way from the principles of the invention. For example, in some rockets the outer wall 16 of the thrust nozzle 10 may advantageously be removed so that the coil formed by conduit 20 around the inner wall 14 of said thrust nozzle will be exposed to the surrounding atmosphere. The aft section of the coil formed by conduit 20 may also be eliminated in some applications of the invention, and it may be desirable in some rockets to embed conduit 20 in an insulating material that is disposed between the inner and outer walls 14, 16 of thrust nozzle 10, in which case conduit 20 will not contact inner wall 14 but will still be in heat-transferring relation therewith. Obviously, the invention is not limited with respect to the means employed for forcing coolant through conduit 20. Hence the scope of the present invention is to be considered as being limited only by the terms of the subjoined claim.

What is claimed is:

1. Apparatus for varying the line of thrust of a rocket thrust nozzle comprising:

a continuous conduit helically wound around said thrust nozzle to form a coil having forward and aft sections which are spaced apart longitudinally of said thrust nozzle and joined by a portion of said conduit which extends longitudinally of said thrust nozzle, the first turn of said first section being disposed adjacent the forward end of said thrust nozzle and the first turn of said aft section being disposed adjacent the aft end of said thrust nozzle, said conduit being in heat-transferring relation with said thrust nozzle;

coolant supply means connected to said first turn of said forward section of said coil and adapted to force coolant therethrough;

a plurality of injection nozzles mounted on said thrust nozzle and each communicatively connected to the last turn of said aft section of said coil, said injection nozzles being spaced circumferentially of said thrust nozzle, spaced equidistant from the aft end thereof, and adapted to inject said coolant transversely into the interior of said thrust nozzle; and a plurality of valves respectively disposed between said conduit and said injection nozzles and adapted to vary the flow of coolant from the latter.

References Cited
UNITED STATES PATENTS

| | | | |
|---|---|---|---|
| 2,962,221 | 11/1960 | Kunz | 239—132.5 |
| 3,069,850 | 12/1962 | Ledwith et al. | |
| 3,116,603 | 1/1964 | Haosmann. | |
| 3,133,413 | 5/1964 | Lawrence. | |
| 3,267,664 | 8/1966 | Jones et al. | 60—39.66 X |

M. HENSON WOOD, Jr., *Primary Examiner.*

M. MAR, *Assistant Examiner.*